(12) United States Patent
Kambara (10) Patent No.: US 11,338,748 B2
(45) Date of Patent: May 24, 2022

(54) IN-VEHICLE POWER SOURCE CONTROL DEVICE AND IN-VEHICLE POWER SOURCE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hisanori Kambara, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 21 days.

(21) Appl. No.: 17/251,591

(22) PCT Filed: May 23, 2019

(86) PCT No.: PCT/JP2019/020492
§ 371 (c)(1),
(2) Date: Dec. 11, 2020

(87) PCT Pub. No.: WO2019/239842
PCT Pub. Date: Dec. 19, 2019

(65) Prior Publication Data
US 2021/0253050 A1    Aug. 19, 2021

(30) Foreign Application Priority Data
Jun. 13, 2018  (JP) .............................. JP2018-112908

(51) Int. Cl.
*B60R 16/033* (2006.01)
*H02J 7/34* (2006.01)
*H02J 9/06* (2006.01)

(52) U.S. Cl.
CPC .............. *B60R 16/033* (2013.01); *H02J 7/34* (2013.01); *H02J 9/06* (2013.01)

(58) Field of Classification Search
CPC .............. B60R 16/033; H02J 7/34; H02J 9/06
(Continued)

(56) References Cited

U.S. PATENT DOCUMENTS 10,847,991 B2 * 11/2020 He .......................... H02J 7/342
11,198,405 B2 * 12/2021 Shimamoto ........... B60R 16/033

FOREIGN PATENT DOCUMENTS

JP    2015-20619 A    2/2015
JP    2015-174552 A    10/2015
(Continued)

OTHER PUBLICATIONS

International Search Report, Application No. PCT/JP2019/020492, dated Jul. 16, 2019. ISA/Japan Patent Office.

*Primary Examiner* — Michael R. Fin
(74) *Attorney, Agent, or Firm* — Honigman LLP (57) ABSTRACT

Provided is a vehicle power source control device and system that supplies power from an auxiliary power source to an in-vehicle load while suppressing the consumption of power when a failure occurs in the main power source when a vehicle has not been started. When a drive signal generation unit generates an off-signal and a main power source has failed, a power source drive circuit in an in-vehicle power source control device controls a power source circuit such that power is supplied from an auxiliary power source to a control unit. If the drive signal generation unit is generating an off-signal and the main power source is in a failed state, the control unit uses power supplied from the auxiliary power source to control the relay to switch to the first stopped state, and controls the converter to switch to the second permissive state.

11 Claims, 5 Drawing Sheets

(58) Field of Classification Search
USPC .................................................. 307/9.1, 10.1
See application file for complete search history.

(56) References Cited

FOREIGN PATENT DOCUMENTS

| | | |
|---|---|---|
| JP | 2016-37064 A | 3/2016 |
| JP | 2018-78682 A | 5/2018 |
| WO | 2017-150124 A1 | 9/2017 |

* cited by examiner

IN-VEHICLE POWER SOURCE CONTROL DEVICE AND IN-VEHICLE POWER SOURCE SYSTEM

CROSS-REFERENCE TO RELATED APPLICATIONS

This application is the U.S. national stage of PCT/JP2019/020492 filed on May 23, 2019, which claims priority of Japanese Patent Application No. JP 2018-112908 filed on Jun. 13, 2018, the contents of which are incorporated herein.

TECHNICAL FIELD

The present disclosure relates to an in-vehicle power source control device and in-vehicle power source system.

BACKGROUND

JP 2016-37064A discloses an in-vehicle power source device that supplies power from a secondary power source to an electrical load that is to be backed-up when the main power source is determined to have malfunctioned. The electrical load is a load that needs to run on power supplied from the secondary power source when the main power source malfunctions. The in-vehicle power source device includes a main power source, a secondary power source, and a secondary power source ECU. A relay is provided on a power line that connects the main power source and the secondary power source to each other. The secondary power source ECU turns on the relay when the vehicle starts up, and causes the electrical load to operate by supplying power from the main power source to the electrical load when the main power source is operating normally. On the other hand, the secondary power source ECU detects the voltage generated in the main power source and detects that the main power source has malfunctioned if the detected voltage has fallen to a predetermined value or lower. The secondary power source ECU turns off the relay and causes the electrical load to operate by supplying power from the secondary power source to the electrical load when it has been detected that the main power source has malfunctioned.

In the in-vehicle power source device of JP 2016-37064A, the secondary power source ECU determines whether or not the main power source has malfunctioned, and therefore needs to be in operation when the main power source malfunctions. For this reason, if the electrical load to be backed-up needs to be operated for a long period of time while the vehicle is not running, the secondary power source ECU needs to maintain the operating state for a long period of time. However, a problem with a configuration in which the secondary power source ECU maintains the operating state for a long period of time is that a large amount of power is consumed.

The present disclosure has been created in order to solve at least one of the problems described above, and an object of the present disclosure is to provide a configuration with which power can be supplied from an auxiliary power source to an in-vehicle load while suppressing the consumption of power if a main power source fails when a vehicle has not been started.

SUMMARY

An in-vehicle power source control device of a first aspect of the present disclosure is an in-vehicle power source control device in an in-vehicle power source system that includes a main power source, an auxiliary power source that includes a power storage unit, a first power path that is a path through which power is supplied from the main power source to the auxiliary power source, a second power path that has one end connected to the first power path and that is a path through which power is supplied from the main power source to an in-vehicle load, and a third power path that has one end connected to the first power path at a point that is closer to the auxiliary power source than a point at which the second power path is connected to the first power path is, and that is a path through which power is supplied from the auxiliary power source to the in-vehicle load as a path that is different to the second power path. The in-vehicle power source control device includes a first switching unit that is provided on the first power path at a point that is closer to the main power source than the point at which the one end of the third power path is connected to the first power path is, and switches between a first permissive state in which the supply of power from the main power source to the auxiliary power source is permitted, and a first stopped state in which the supply of power from the main power source to the auxiliary power source is stopped. A second switching unit is provided on the first power path at a point that is closer to the auxiliary power source than the point where the one end of the third power path is connected to the first power path is, or is provided on the third power path, and switches between a second permissive state in which the supply of power from the auxiliary power source to the in-vehicle load is permitted, and a second stopped state in which the supply of power from the auxiliary power source to the in-vehicle load is stopped. A control unit controls the first switching unit and the second switching unit. A power source circuit supplies power to the control unit based on the power supplied from the auxiliary power source. A power source drive circuit operates based on the power supplied from at least the auxiliary power source out of the main power source and the auxiliary power source, and controls the power source circuit. A generation unit generates an off-signal when a start switch that starts a vehicle is off, and generates an on-signal when the start switch is on, wherein the power source drive circuit controls the power source circuit such that power is supplied from the auxiliary power source to the control unit when the generation unit is generating an off-signal and it has been detected that the main power source is in a failed state, and when the generation unit is generating an off-signal and it has been detected that the main power source is in the failed state, the control unit uses power supplied from the auxiliary power source to control the first switching unit to switch to the first stopped state, and to control the second switching unit to switch to the second permissive state.

An in-vehicle power source system of a second aspect of the present disclosure includes the in-vehicle power source control device, the main power source, and the auxiliary power source.

Advantageous Effects of Disclosure

The in-vehicle power source control device according to the first aspect includes the power source drive circuit that controls the power source circuit such that power is supplied from the auxiliary power source to the control unit when the generation unit is generating an off-signal and it is detected that the main power source is in a failed state. For this reason, in a state in which the vehicle has not been started, it is possible to prevent the power of the auxiliary power source from being discharged via the power source circuit until it has been detected that a failure has occurred in the main power source. Thus, if the generation unit is generating an off-signal and it is detected that the main power source is in a failed state, the control unit controls the first switching unit to switch to the first stopped state, and the second switching unit to switch to the second permissive state. Thus, by stopping the supply of power between the main power source and the auxiliary power source and permitting power to be supplied from the auxiliary power source to the in-vehicle load, it is possible to appropriately supply power from the auxiliary power source to the in-vehicle load without power being supplied from the auxiliary power source to the main power source. Accordingly, in a state in which the vehicle has not been started, it is possible to appropriately supply power from the auxiliary power source to the in-vehicle load while suppressing the consumption of power if a failure occurs in the main power source.

With the in-vehicle power source system of the second aspect, it is possible to exhibit effects that are similar to those exhibited by the in-vehicle power source control device of the first aspect.

DETAILED DESCRIPTION OF PREFERRED EMBODIMENTS

The following are desirable examples of the present disclosure. However, the present disclosure is not limited by the following examples.

Configurations are also possible in which the control unit is in a stopped state in which operations thereof are stopped when the generation unit is generating an off-signal.

With this configuration, in a state in which the vehicle has not been started, the control unit remains in the stopped state and therefore it is possible to stop the operation of the control unit until a failure occurs in the main power source. Thus, it is possible to suppress the consumption of power by the control unit until a failure occurs in the main power source.

Configurations are also possible in which the power source drive circuit detects the voltage value of the voltage that is applied from the main power source to the first power path, and detects that the main power source is in the failed state if the voltage value is lower than a predetermined threshold value.

With this configuration, it is possible to determine whether or not the main power source is in the failed state by using the voltage value of the voltage applied to the first power path from the main power source. Thus, it is possible to directly ascertain a failure in the main power source and it becomes easier to correctly determine that the main power source is in the failed state.

Configurations are also possible in which the in-vehicle load may also include the generation unit. The generation unit may also detect the voltage value of the voltage applied from the main power source to the in-vehicle load via the first power path and the second power path, and detect that the main power source is in the failed state if the voltage value is lower than a predetermined threshold value.

With the in-vehicle power source control device configured in this way, the function of the generation unit can be imparted to the in-vehicle load, which thereby eliminates the need to provide a separate detection unit. Thus, it is possible to simplify the device.

First Embodiment

The following describes the first embodiment that embodies the present disclosure. An in-vehicle power source system 100 (hereinafter also referred to as "system 100") shown in FIG. 1 includes a main power source 11 that serves as the main source of power to be supplied, an auxiliary power source 12 that serves as a source of power to be supplied that is different to the main power source 11, and an in-vehicle power source control device 10 (hereinafter also referred to as "power source control device 10") that controls the main power source 11 and the auxiliary power source 12, and is configured as a power source system that supplies power to an in-vehicle load 13 (which is to be backed-up, and hereinafter may also be referred to as "load 13"). The in-vehicle power source system 100 further includes a first power path 14, a second power path 15, and a third power path 16. The first power path 14 is a conduction path that serves as a path through which power is supplied from the main power source 11 to the auxiliary power source 12. The second power path 15 is a conduction path that has one end connected to the first power path 14, and that serves as a path through which power is supplied from the main power source 11 to the load 13. The third power path 16 is a conduction path that has one end connected to the first power path 14 at a point that is closer to the auxiliary power source 12 than the point at which the second power path 15 is connected to the first power path 14 is, and is a path through which power is supplied from the auxiliary power source 12 to the load 13 as path that is different to the second power path 15. Also, an in-vehicle auxiliary power source device 20 is constituted by the auxiliary power source 12 and the power source control device 10.

Figure 1:
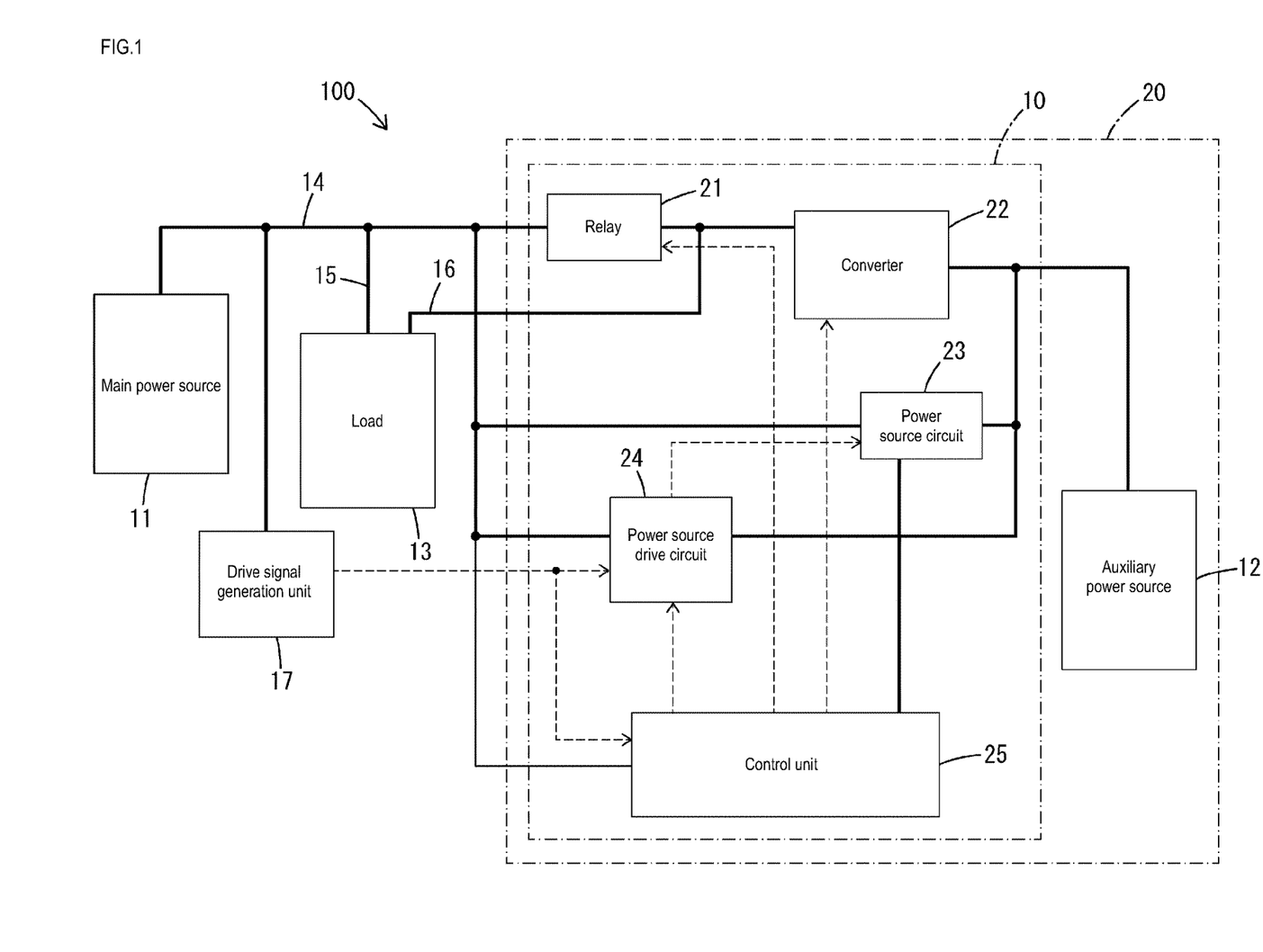
FIG. 1 is a block diagram schematically showing an example of a configuration of an in-vehicle power source system that includes an in-vehicle power source control device of a first embodiment.

When the main power source 11 is in a normal state, the system 100 supplies power from the main power source 11 to the load 13 while charging the auxiliary power source 12 with the power supplied from the main power source 11. Note that "when the main power source 11 is in a normal state" means, for example, a state in which a voltage of a predetermined voltage value or greater is applied from the main power source 11 to the load 13. On the other hand, when the main power source 11 is in an abnormal state (failed state), the system 100 supplies power from the auxiliary power source 12 to the load 13. Note that "when the main power source 11 is in an abnormal state (failed state)" means, for example, a state in which a voltage of a predetermined voltage value or greater is not applied from the main power source 11 to the load 13.

The main power source 11 is configured as a known in-vehicle battery (including a mechanical auxiliary power source) such as a lead battery. The main power source 11 includes a high potential terminal that is electrically connected to the first power path 14 and applies an output voltage of a predetermined value (12 V, for example) to the first power path 14. A low potential terminal of the main power source 11 is electrically connected to a ground portion that is provided in the vehicle. Note that a fuse (not shown) is provided on the first power path 14 at an intermediate point thereof. Also, the main power source 11 is electrically connected to a generator (not shown) and can be charged with power from the generator.

The auxiliary power source 12 is configured as a power storage unit that includes a plurality of power storage cells (not shown). The power storage cells may be constituted by a known power storage means such as an electric double layer capacitor, a lithium-ion battery, or the like. The auxiliary power source 12 is constituted by a plurality of power storage cells connected in series, and functions as a power storage unit in which a desired output voltage is produced by the plurality of power storage cells. The lowest potential terminal of the auxiliary power source 12 (power storage unit) is electrically connected to the ground, and this terminal is kept at a predetermined low potential (0 V). Also, the highest potential terminal of the auxiliary power source 12 (power storage unit) is electrically connected to a converter 22, a power source circuit 23, and a control unit 25 that will be described later, and this terminal receives a voltage corresponding to the amount of charge in the auxiliary power source 12.

The load 13 is configured as a known in-vehicle electrical component. The load 13 is, for example, an electrical component that starts up and operates when the main power source 11 fails (when the supply of power from the main power source 11 is cut off), and may be a security-related ECU or the like. The load 13 operates based on power supplied from the main power source 11 when the state thereof is the normal state as described above, and operates based on power supplied from the auxiliary power source 12 when the state of the main power source 11 is the abnormal state as described above.

One end of the first power path 14 is electrically connected to the main power source 11, and the other end of the first power path 14 is electrically connected to the auxiliary power source 12. One end of the second power path 15 is connected to the first power path 14, and the other end of the second power path 15 is electrically connected to the load 13. One end of the third power path 16 is connected to the first power path 14 at a point that is closer to the auxiliary power source 12 than the point at which the second power path 15 is connected to the first power path 14 is, and the other end of the third power path 16 is electrically connected to the load 13.

As shown in FIG. 1, the power source control device 10 includes a relay 21, the converter 22, the power source circuit 23, and a power source drive circuit 24. The relay 21 is equivalent to an example of a first switching unit. The relay 21 is provided on the first power path 14, on the main power source 11 side of the point where the one end of the third power path 16 is connected to the first power path 14. Specifically, the relay 21 is provided on the first power path 14 between the point where the one end of the second power path 15 is connected to the first power path 14 and the point where the one end of the third power path 16 is connected to the first power path 14. One end of the relay 21 is electrically connected to the main power source 11, and another end of the relay 21 is electrically connected to the auxiliary power source 12. The relay 21 is constituted by one or more semiconductor switches (such as FETs and transistors), mechanical relays, or the like, and switches between off and on. The relay 21 functions to switch between a first permissive state in which the supply of power from the main power source 11 to the auxiliary power source 12 is permitted, and a first stopped state in which the supply of power from the main power source 11 to the auxiliary power source 12 is stopped. Specifically, the relay 21 allows current to flow from the main power source 11 to the auxiliary power source 12 when the relay 21 is on, and blocks the flow of current from the main power source 11 to the auxiliary power source 12 when the relay 21 is off.

The converter 22 is equivalent to an example of a second switching unit. As shown in FIG. 1, the converter 22 is provided on the first power path 14, on the auxiliary power source 12 side of the point where the one end of the third power path 16 is connected the first power path 14. Specifically, the converter 22 is provided on the first power path 14 between the point where the third power path 16 is connected to the first power path 14 and the auxiliary power source 12. The converter 22 may be configured as a known in-vehicle step-up/step-down DC-DC converter, for example. The converter 22 functions to switch between a second permissive state in which the supply of power from the auxiliary power source 12 to the load 13 is permitted, and a second stopped state in which the supply of power from the auxiliary power source 12 to the load 13 is stopped. Also, the converter 22 functions to step-up or step-down DC voltage that is applied to either the first power path 14 or the second power path 15, and to output the stepped-up or stepped-down DC voltage to the other power path. The converter 22 may, for example, have a step-down function that permits current to flow from the main power source 11 to the auxiliary power source 12, steps-down the voltage applied from the main power source 11 to the first power path 14, and outputs the stepped-down voltage to the auxiliary power source 12, and a step-up function that permits current to flow from the auxiliary power source 12 to the load 13, steps-up the voltage applied from the auxiliary power source 12 to the first power path 14, and outputs the stepped-up voltage to the load 13.

As shown in FIG. 1, a drive signal generation unit 17 is connected to the first power path 14 between the point where the main power source 11 is connected to the first power path 14 and the point where the load 13 is connected to the first power path 14. The drive signal generation unit 17 is equivalent to an example of a generation unit. The drive signal generation unit 17 generates an off-signal when a start switch (such as an ignition switch) that starts a vehicle is off, or generates an on-signal (drive signal) when the start switch is on. Also, the drive signal generation unit 17 outputs signals to the power source drive circuit 24 and the control unit 25. The drive signal generation unit 17 operates on power supplied from the main power source 11.

The power source circuit 23 is constituted by a known regulator or the like. As shown in FIG. 1, the power source circuit 23 is provided on the first power path 14 so as to be parallel to the serial configuration of the relay 21 and the converter 22. The power source circuit 23 is electrically connected to the control unit 25, which will be described later, and functions to stably supply power to the control unit 25 based on the power that is supplied from the auxiliary power source 12.

The power source drive circuit 24 is configured as a known voltage detection circuit. As shown in FIG. 1, the power source drive circuit 24 is provided on the first power path 14 so as to be parallel to the series configuration of the relay 21 and the converter 22, and be parallel to the power source circuit 23. The power source drive circuit 24 operates based on power supplied from at least the auxiliary power source 12 out of the main power source 11 and the auxiliary power source 12, and controls the operation of the power source circuit 23. The power source drive circuit 24 detects the voltage of the high-potential side terminal of the main power source 11, and can identify the output voltage of the main power source 11. Also, the power source drive circuit 24 detects the voltage applied from the main power source 11 to the first power path 14, and determines whether or not the detected voltage has fallen below a threshold value. If the power source drive circuit 24 determines that the detected voltage has fallen below the threshold value, the power source drive circuit 24 detects that the main power source 11 is in a failed state. Also, if the power source drive circuit 24 detects that the main power source 11 is in the failed state when the start switch is off, the power source drive circuit 24 outputs an on-signal to the power source circuit 23.

The control unit 25 controls the operation of the relay 21, the converter 22, and the power source drive circuit 24. The control unit 25 may be configured as a microcomputer for example, and includes an arithmetic unit such as a CPU, a memory such as ROM or RAM, and the like. The control unit 25 operates on power supplied from the auxiliary power source 12. The control unit 25, for example, controls the relay 21 to switch between the first permissive state and the first stopped state, and controls the converter 22 to switch between the second permissive state and the second stopped state. Also, the control unit 25 controls the power source drive circuit 24 and maintains the state of output to the power source circuit 23.

Next, backup control by the power source control device 10 will be described using FIGS. 2 to 4.

Figure 2:
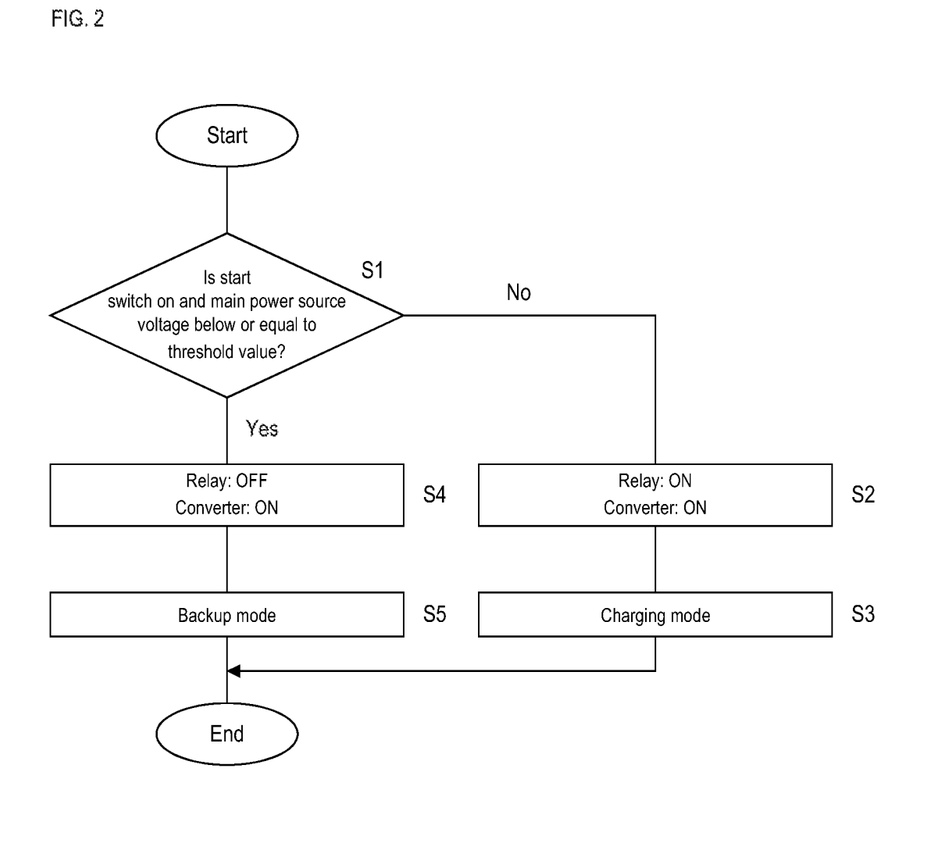
FIG. 2 is a flow chart showing an example of the flow of backup control performed by the in-vehicle power source control device of the first embodiment.
Figure 3:
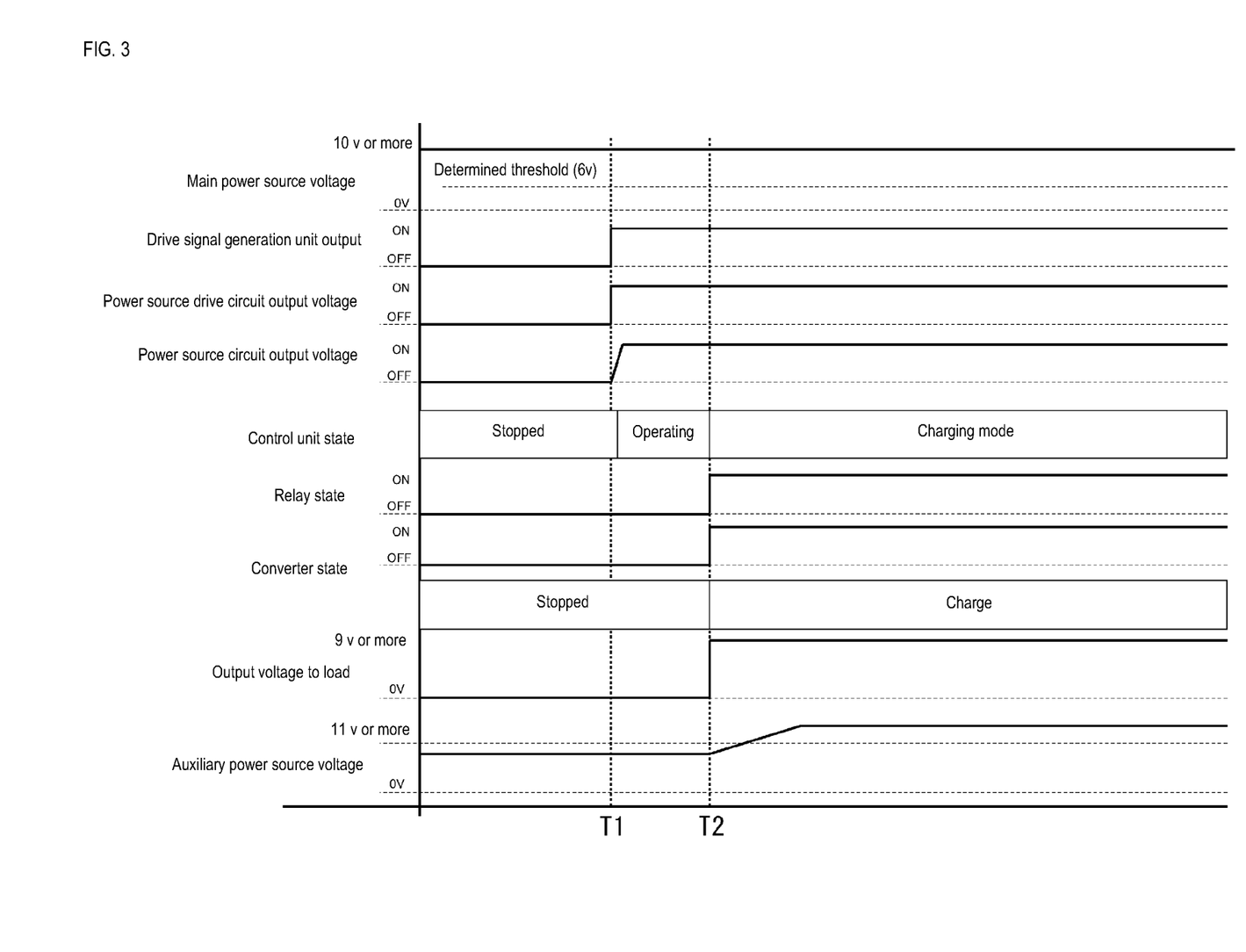
FIG. 3 is a timing chart showing an example of timings when the main power source is operating normally in backup control performed by the in-vehicle power source control device of the first embodiment.

As shown in FIG. 3, the power source control device 10 includes the main power source 11 that applies a voltage of 10 V or more to the first power path 14 when the main power source 11 is operating normally. Also, the start switch is operated to switch from off to on at a timing T1. Thus, the drive signal generation unit 17 outputs an on-signal (drive signal) to the power source drive circuit 24 and the control unit 25 at the timing T1. The power source drive circuit 24 outputs the on-signal to the power source circuit 23 upon acquiring the on-signal from the drive signal generation unit 17. The control unit 25 starts up upon acquiring the on-signal from the drive signal generation unit 17. Note that the control unit 25 is in a stopped state in which the operation thereof is stopped if the control unit 25 does not acquire the on-signal from the drive signal generation unit 17. The power source circuit 23 supplies the power that is supplied from the auxiliary power source 12 to the control unit 25 upon acquiring the on-signal from the power source drive circuit 24. The control unit 25 starts backup control as shown in FIG. 2 upon being supplied power from the auxiliary power source 12 via the power source circuit 23.

Figure 4:
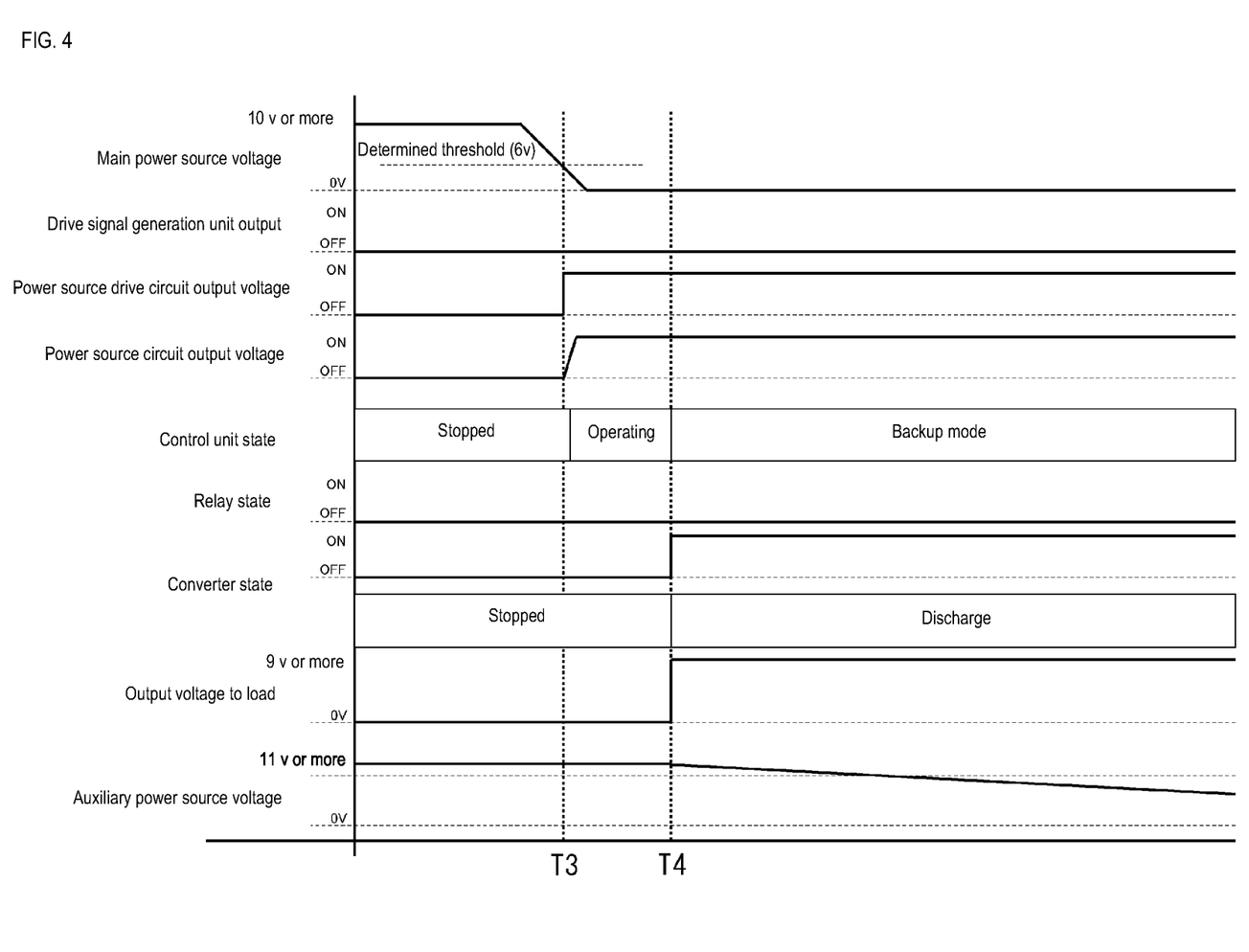
FIG. 4 is a timing chart showing examples of timings when the main power source fails in backup control performed by the in-vehicle power source control device of the first embodiment.

On the other hand, as shown in FIG. 4, when the main power source 11 is abnormal (has failed), the voltage applied from the main power source 11 to the first power path 14 in the power source control device 10 falls from 10 V or more and the voltage lowers below a threshold value (6 V for example) at a timing T3, for example. The power source drive circuit 24 outputs an on-signal to the power source circuit 23 upon detecting that the voltage applied from the main power source 11 to the first power path 14 has fallen below a threshold value. Thus, the power source drive circuit 24 controls the power source circuit 23 such that power is supplied from the auxiliary power source 12 to the control unit 25. The power source circuit 23 supplies the power that is supplied from the auxiliary power source 12 to the control unit 25 upon acquiring the on-signal from the power source drive circuit 24. The control unit 25 starts up and starts backup control as shown in FIG. 2 upon being supplied power from the auxiliary power source 12 via the power source circuit 23.

Here, if the power is not supplied from the auxiliary power source 12, the control unit 25 is in a stopped state in which operation is stopped while the power source drive circuit 24 has not detected that the main power source 11 has failed. For that reason, in a state in which the vehicle has not been started, it is possible to prevent the power of the auxiliary power source 12 from being discharged via the power source circuit 23 until the power source drive circuit 24 detects that a failure has occurred in the main power source 11. Due to this, the control unit 25 remains in the stopped state, and is therefore stopped until a failure occurs in the main power source 11, thus suppressing the consumption of power.

As shown in FIG. 2, when the control unit 25 starts up, the control unit 25 determines whether or not the start switch is off (the drive signal generation unit 17 has generated an off-signal), and whether or not the voltage applied from the main power source 11 to the first power path 14 is lower than or equal to a threshold value (step S1). The control unit 25 may acquire, from the power source drive circuit 24, the result of determining whether or not the voltage applied from the main power source 11 to the first power path 14 is lower than or equal to a threshold value. As shown in FIG. 3, if the start switch is switched from off to on when the main power source 11 is operating normally, the control unit 25 determines whether or not the start switch is on, and whether or not the voltage applied from the main power source 11 to the first power path 14 is lower than or equal to a threshold value. Thus, the processing in step S1 proceeds to "NO", and the control unit 25 switches the relay 21 on (first permissive state) and switches the converter 22 on (second permissive state) at a timing T2 (step S2). Thus, the control unit 25 allows current to flow from the main power source 11 to the load 13 and to the auxiliary power source 12, and initiates a charging mode (step S3). In the charging mode, the main power source 11 supplies power to the load 13 and to the auxiliary power source 12.

Then, upon acquiring an off-signal (stop signal) from the drive signal generation unit 17 when the start switch is switched from on to off, the control unit 25 switches the relay 21 off (first stopped state) and switches the converter 22 off (second stopped state). The control unit 25 is then stopped and ends the control shown in FIG. 2.

One the other hand, as shown in FIG. 4, the start switch remains off, a failure occurs in the main power source 11, and the voltage that is applied from the main power source 11 to the first power path 14 is lower than or equal to a threshold value at the timing T3. In this case, the control unit 25 determines that the start switch is off (the drive signal generation unit 17 has generated an off-signal), and that the voltage applied from the main power source 11 to the first power path 14 is lower than or equal to a threshold value. Thus, the processing in step S1 proceeds to YES, and then at a timing T4, the control unit 25 uses the power supplied from the auxiliary power source 12 to switch the relay 21 off (first stopped state), and to switch the converter 22 on (second permissive state) (step S4). In this way, the control unit 25 disallows current from flowing from the main power source 11 to the auxiliary power source 12 and allows current to flow (be discharged) from the auxiliary power source 12 to the load 13, thus initiating a backup mode (step S5). In the backup mode, the main power source 11 does not supply power to the load 13 and the auxiliary power source 12. In the backup mode, the auxiliary power source 12 supplies power to the load 13.

In this way, if it is detected that a failure has occurred in the main power source 11 in a state in which the vehicle has not been started, the control unit 25 stops the supply of power between the main power source 11 and the auxiliary power source 12, and permits the supply of power from the auxiliary power source 12 to the load 13. For this reason, the control unit 25 can appropriately supply power from the auxiliary power source 12 to the load 13 without power being supplied from the auxiliary power source 12 to the main power source 11. Accordingly, in a state in which the vehicle has not been started, it is possible to suppress the consumption of power by stopping the control unit 25 until a failure occurs in the main power source 11, and appropriately supply power from the auxiliary power source 12 to the load 13 if a failure occurs in the main power source 11.

Then, if the output voltage from the auxiliary power source 12 reaches a predetermined low level for example, the control unit 25 switches the converter 22 off (second stopped state). The control unit 25 is then stopped and ends the control shown in FIG. 2.

Next, effects of the present configuration will be described.

The power source control device 10 as described above includes the power source drive circuit 24 that controls the power source circuit 23 such that power is supplied from the auxiliary power source 12 to the control unit 25 when the drive signal generation unit 17 is generating an off-signal and it is detected that the main power source 11 is in the failed state. For this reason, in a state in which the vehicle has not been started, it is possible to prevent the power of the auxiliary power source 12 from being discharged via the power source circuit 23 until it has been detected that a failure has occurred in the main power source 11. Thus, if the drive signal generation unit 17 is generating an off-signal and it is detected that the main power source 11 is in the failed state, the control unit 25 controls the relay 21 to switch to the first stopped state, and controls the converter 22 to switch to the second permissive state. Thus, by stopping the supply of power between the main power source 11 and the auxiliary power source 12 and permitting power to be supplied from the auxiliary power source 12 to the load 13, it is possible to appropriately supply power from the auxiliary power source 12 to the load 13 without power being supplied from the auxiliary power source 12 to the main power source 11. Accordingly, if a failure occurs in the main power source 11 while the vehicle has not been started, it is possible to appropriately supply power from the auxiliary power source 12 to the load 13 while suppressing the consumption of power.

The control unit 25 is in a stopped state in which the operation thereof is stopped if the drive signal generation unit 17 is generating an off-signal. With this configuration, in a state in which the vehicle has not been started, the control unit 25 remains in the stopped state and therefore it is possible to stop the operation of the control unit 25 until a failure occurs in the main power source 11. Thus, it is possible to suppress the consumption of power by the control unit 25 until a failure occurs in the main power source 11.

The power source drive circuit 24 may also detect the voltage value of the voltage that is applied from the main power source 11 to the first power path 14, and detects that the main power source 11 is in the failed state if the voltage value is lower than a predetermined threshold value.

With this configuration, it is possible to determine whether or not the main power source 11 is in the failed state by using the voltage value of the voltage applied to the first power path 14 from the main power source 11. Thus, it is possible to directly ascertain a failure in the main power source 11, and it becomes easier to correctly determine that the main power source 11 is in the failed state.

Second Embodiment

Next, the second embodiment will be described.

Figure 5:
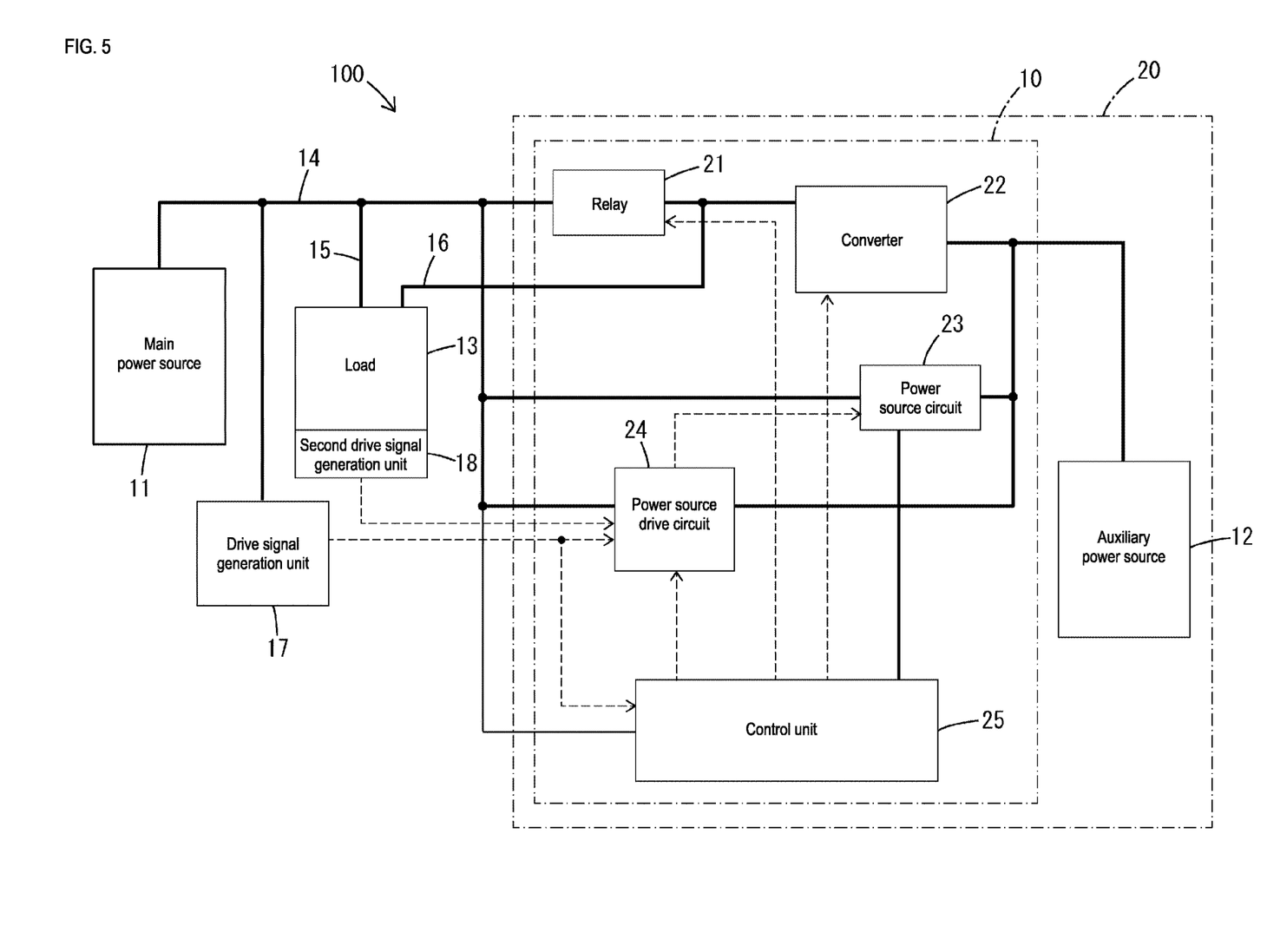
FIG. 5 is a block diagram schematically showing an example of a configuration of the in-vehicle power source system that includes an in-vehicle power source control device of a second embodiment.

The in-vehicle power source system 100 of the second embodiment is different to that of the first embodiment in that the load 13 can detect that the main power source 11 is in the abnormal state (failed state). Note that other configurations and processes are similar to those of the first embodiment. Accordingly, in the following description, the same reference numerals as those in the first embodiment are given to components that are the same as those in the first embodiment and detailed descriptions thereof are omitted, and the differences from the first embodiment are mainly described. Note that the in-vehicle power source system 100 shown in FIG. 5 is the same as the in-vehicle power source system 100 shown in FIG. 1 except for the configuration of the load 13.

The load 13 is configured as an in-vehicle electrical component that is similar to that of the first embodiment. The load 13 further includes a second drive signal generation unit 18. The second drive signal generation unit 18 is equivalent to an example of a generation unit. The second drive signal generation unit 18 is configured as a known voltage detection circuit, and detects the voltage value of the voltage that is applied from the main power source 11 to the load 13 via the first power path 14 and the second power path 15. Thus, if the detected voltage value is lower than a predetermined threshold value, the second drive signal generation unit 18 detects that the main power source 11 is in the failed state. If the second drive signal generation unit 18 detects that the main power source 11 is in the failed state, the second drive signal generation unit 18 outputs an on-signal to the power source drive circuit 24.

If the power source drive circuit 24 acquires the on-signal from the load 13 while the start switch is off, similarly to the first embodiment, the power source circuit 23 outputs an on-signal.

The backup control by the power source control device 10 is similar to that in the first embodiment, and therefore a description thereof will be omitted.

With the power source control device 10 of the second embodiment, the load 13 includes the drive signal generation unit 17. Thus, the drive signal generation unit 17 detects the voltage value of the voltage applied from the main power source 11 to the in-vehicle load 13 via the first power path 14 and the second power path 15, and detect that the main power source 11 is in the failed state if the voltage value is lower than a predetermined threshold value.

With the power source control device 10 configured in this way, the function of the drive signal generation unit 17 can be imparted to the load 13, which thereby eliminates the need to provide a separate detection unit. Thus, it is possible to simplify the device.

Other Embodiments

The present disclosure is not limited to the embodiments described above and illustrated in the drawings, and the following examples are included in the technical scope of the present disclosure.

In the first and second embodiments, the converter 22 is given as an example of a second switching unit, but configurations are also possible in which a relay is provided as an example of the second switching unit. Similarly to the converter 22, such a relay functions to switch between a second permissive state in which the supply of power from the auxiliary power source 12 to the load 13 is permitted, and a second stopped state in which the supply of power from the auxiliary power source 12 to the load 13 is stopped.

In the first and second embodiments, the control unit 25 is in a stopped state in which operation thereof is stopped if power is not supplied from the auxiliary power source 12 to the control unit 25, but this state may also be a power-saving state. The power-saving state may be a state in which, for example, the operating frequency of the microcomputer is smaller than when power is being supplied from the auxiliary power source 12 to the control unit 25.

In the first and second embodiments, the control unit 25 starts up upon acquiring an on-signal from the drive signal generation unit 17 when the main power source 11 is operating normally, but configurations are also possible in which the control unit 25 becomes operative by receiving power from the auxiliary power source 12 via the power source circuit 23.

In the first embodiment, the power source drive circuit 24 detects whether or not the voltage applied from the main power source 11 to the first power path 14 has fallen below a threshold value, but configurations are also possible in which the drive signal generation unit 17 detects whether or not the voltage applied from the main power source 11 to the first power path 14 has fallen below a threshold value. Thus, the power source drive circuit 24 operates upon acquiring, from the drive signal generation unit 17, a signal related to the start switch, and a signal related to the failed state of the main power source 11.

The invention claimed is:

1. An in-vehicle power source control device in an in-vehicle power source system that includes a main power source, an auxiliary power source that includes a power storage unit, a first power path that is a path through which power is supplied from the main power source to the auxiliary power source, a second power path that has one end connected to the first power path and that is a path through which power is supplied from the main power source to an in-vehicle load, and a third power path that has one end connected to the first power path at a point that is closer to the auxiliary power source than a point at which the second power path is connected to the first power path is, and that is a path through which power is supplied from the auxiliary power source to the in-vehicle load as a path that is different to the second power path, the in-vehicle power source control device comprising:

a first switching unit that is provided on the first power path at a point that is closer to the main power source than the point at which the one end of the third power path is connected to the first power path is, and switches between a first permissive state in which the supply of power from the main power source to the auxiliary power source is permitted, and a first stopped state in which the supply of power from the main power source to the auxiliary power source is stopped;

a second switching unit that is provided on the first power path at a point that is closer to the auxiliary power source than the point where the one end of the third power path is connected to the first power path is, or is provided on the third power path, and switches between a second permissive state in which the supply of power from the auxiliary power source to the in-vehicle load is permitted, and a second stopped state in which the supply of power from the auxiliary power source to the in-vehicle load is stopped;

a control unit that controls the first switching unit and the second switching unit;

a power source circuit that supplies power to the control unit based on the power supplied from the auxiliary power source;

a power source drive circuit that operates based on the power supplied from at least the auxiliary power source out of the main power source and the auxiliary power source, and controls the power source circuit; and a generation unit that generates an off-signal when a start switch that starts a vehicle is off, and generates an on-signal when the start switch is on, wherein the power source drive circuit controls the power source circuit such that power is supplied from the auxiliary power source to the control unit when the generation unit is generating an off-signal and it has been detected that the main power source is in a failed state, and when the generation unit is generating an off-signal and it has been detected that the main power source is in the failed state, the control unit uses power supplied from the auxiliary power source to control the first switching unit to switch to the first stopped state, and to control the second switching unit to switch to the second permissive state.

2. The in-vehicle power source control device according to claim 1, wherein the control unit is in a stopped state in which operations thereof are stopped when the generation unit is generating an off-signal.

3. The in-vehicle power source control device according to claim 1, wherein the power source drive circuit detects the voltage value of the voltage that is applied from the main power source to the first power path, and detects that the main power source is in the failed state if the voltage value is lower than a predetermined threshold value.

4. The in-vehicle power source control device according to claim 1, wherein the in-vehicle load includes the generation unit, and the generation unit detects the voltage value of the voltage applied from the main power source to the in-vehicle load via the first power path and the second power path, and detects that the main power source is in the failed state if the voltage value is lower than a predetermined threshold value.

5. An in-vehicle power source system that includes the in-vehicle power source control device according to claim 1, the main power source, and the auxiliary power source.

6. The in-vehicle power source control device according to claim 2, wherein the power source drive circuit detects the voltage value of the voltage that is applied from the main power source to the first power path, and detects that the main power source is in the failed state if the voltage value is lower than a predetermined threshold value.

7. The in-vehicle power source control device according to claim 2, wherein the in-vehicle load includes the generation unit, and the generation unit detects the voltage value of the voltage applied from the main power source to the in-vehicle load via the first power path and the second power path, and detects that the main power source is in the failed state if the voltage value is lower than a predetermined threshold value.

8. The in-vehicle power source system according to claim 5, wherein the control unit is in a stopped state in which operations thereof are stopped when the generation unit is generating an off-signal.

9. The in-vehicle power source system according to claim 8, wherein the power source drive circuit detects the voltage value of the voltage that is applied from the main power source to the first power path, and detects that the main power source is in the failed state if the voltage value is lower than a predetermined threshold value.

10. The in-vehicle power source system according to claim 5, wherein the in-vehicle load includes the generation unit, and the generation unit detects the voltage value of the voltage applied from the main power source to the in-vehicle load via the first power path and the second power path, and detects that the main power source is in the failed state if the voltage value is lower than a predetermined threshold value.

11. The in-vehicle power source system according to claim 8 wherein the in-vehicle load includes the generation unit, and the generation unit detects the voltage value of the voltage applied from the main power source to the in-vehicle load via the first power path and the second power path, and detects that the main power source is in the failed state if the voltage value is lower than a predetermined threshold value.

* * * * *